UNITED STATES PATENT OFFICE.

WILLIAM T. GIBBS, OF BUCKINGHAM, CANADA.

PROCESS OF DECOMPOSING REFRACTORY SILICATES.

SPECIFICATION forming part of Letters Patent No. 772,657, dated October 18, 1904.

Application filed May 21, 1904. Serial No. 209,113. (No specimens.)

*To all whom it may concern:*

Be it known that I, WILLIAM T. GIBBS, a subject of the King of Great Britain and Canada, residing at Buckingham, county of Ottawa, Province of Quebec, Canada, have invented certain new and useful Improvements in Methods of Decomposing Refractory Silicates, described in the following specification.

This invention relates to a new method of decomposing or breaking up refractory silicates—such, for instance, as the feldspars, potash mica, and the like—the especial object of the invention being to provide a simple and commercial method of treating such silicates for the recovery of the potash and alumina or other valuable constituents.

My method consists in reducing the silicates to a finely-divided condition and then treating them with a solution of hydrofluosilicic acid, so as to remove the bases from their combination with the silica by combining them with the acid. The quantity of hydrofluosilicic acid is preferably in excess of the amount required to combine with the bases, so as to assure complete decomposition of the silicates and to avoid an unnecessarily slow reaction toward the end of the process; but this is not essential to the invention, broadly considered. After the decomposition the solution and residue may be treated as desired for the recovery of the valuable constituents, and the silico-fluorids of the bases formed by their combination with the hydrofluosilicic acid are preferably treated so as to recover the hydrofluosilicic acid to be again used used in the process.

The preferred manner of carrying out my complete process is as follows, described as applied in connection with feldspar: The feldspar is ground, preferably in a pebble-mill, so as to be reduced to a fine powder, preferably to the finest dust possible, and in practice air separation may well be used in connection with fine grinding. The pulverized feldspar is then put in a suitable tank and digested with a solution of hydrofluosilicic acid, which should be as strong as practicable. It is impracticable, however, to obtain a solution of more than thirty-five to forty per cent. acid, and a solution of this strength works very satisfactorily. Acid of much lower strength may be used, however; but the action would necessarily be slower and less economical as compared with a stronger acid. As stated above, the amount of hydrofluosilicic acid originally introduced is preferably in excess of the amount required to combine with the bases, so as to assure complete decomposition of the silicates with a reasonably rapid reaction throughout the process. The same result of having the amount of the hydrofluosilicic acid in excess of the amount required to combine with the bases may obviously be secured by adding hydrofluosilicic acid during the process. After the feldspar is completely decomposed the solution contains the alumina as silico-fluorid of aluminium, and the residue consists of the silica previously combined in the spar and silico-fluorid of potassium. The solution is then preferably separated from the residue by filtration and may then be treated by evaporation to obtain the salt of alumina in a solid condition, and from this salt the sulfate or other compound may be prepared by any known method. If treated with sulfuric acid, sulfate of alumina is formed, and hydrofluosilicic acid is volatilized and may be recovered by condensation. The residue may be treated in any known manner for the recovery of the potash contained therein and the separation of silica as such. This may be accomplished by treating the residue with sulfuric acid, in which case sulfate of potassium is obtained in solution, the silica is left as an insoluble residue, and the hydrofluosilicic acid is volatilized and may be recovered by condensation.

It will be understood that the present invention relates only to the decomposition of the refractory silicates and the recovery of the hydrofluosilicic acid for reuse and that the products of the decomposition may be treated in any suitable manner, according to the final products desired. The treatment of the products of decomposition stated above are given only as examples of methods that may be used, and the process forming the present invention is not limited thereto.

What I claim is—

1. The method of decomposing refractory silicates, which consists in reducing the silicates to a finely-divided condition and removing the bases from their combination with the silica by combining them with hydrofluosilicic acid.

2. The method of decomposing refractory silicates, which consists in reducing the silicates to a finely-divided condition and treating them with a solution containing hydrofluosilicic acid, the hydrofluosilicic acid being in excess of the amount required to combine with the bases of the silicate.

3. The method of decomposing refractory silicates, which consists in reducing the silicates to a finely-divided condition, removing the bases from their combination with the silica by combining them with hydrofluosilicic acid, and subsequently treating the silico-fluorids of the bases to recover the hydrofluosilicic acid.

4. The method of decomposing refractory silicates, which consists in reducing the silicates to a finely-divided condition, treating them with a solution containing hydrofluosilicic acid, the hydrofluosilicic acid being in excess of the amount required to combine with the bases of the silicate, and subsequently treating the silico-fluorids of the bases to recover the hydrofluosilicic acid.

In testimony whereof I have hereunto set my hand in the presence of two subscribing witnesses.

WILLIAM T. GIBBS.

Witnesses:
FRED. J. HAMBLY,
EDGAR ROY.